United States Patent [19]

Games et al.

[11] 3,735,391

[45] May 22, 1973

[54] MAGNETIC SYNCHRO ANGLE RESOLVER

[75] Inventors: John E. Games, Granby; Clarence Casper, Jr., Windsor, both of Conn.

[73] Assignee: United Aircraft Corporation, East Hartford, Conn.

[22] Filed: Aug. 5, 1971

[21] Appl. No.: 169,387

[52] U.S. Cl..............340/347 SY, 325/10, 328/165, 340/198
[51] Int. Cl..............................................H03k 13/02
[58] Field of Search.............................328/165, 166; 323/44, 51, 52; 340/198, 347 SY; 325/10

[56] References Cited

UNITED STATES PATENTS

| | | | |
|---|---|---|---|
| 3,426,291 | 2/1969 | Weglein | 328/165 |
| 3,438,026 | 4/1969 | Prill | 340/347 SY |
| 3,439,556 | 4/1969 | Wing | 323/51 |
| 3,539,930 | 11/1970 | Strole | 328/166 |
| 3,532,898 | 10/1970 | Anderson | 328/166 |
| 3,657,717 | 4/1972 | Glantschnig | 340/347 SY |

*Primary Examiner*—Thomas A. Robinson
*Assistant Examiner*—Jeremiah Glassman
*Attorney*—Melvin Pearson Williams

[57] ABSTRACT

A magnetic synchro second harmonic generator has line voltage bucked out in current summing means, and is synchronously rectified in balanced demodulators utilizing double the line frequency as a reference. Filtering removes remaining odd harmonics, and functions of the sum and difference of the two filtered outputs provide signals comprising quadrature related sine and cosine functions of the desired rotor angle. By sensing the sign of the quadrature components, and which of them has a greater absolute magnitude, all eight octants of a circle can be identified; within each octant, a digital word representing the tangent or cotangent (chosen so that either is always less than one, when used) together with the sign and magnitude bits comprise a complete digital resolution of the angle. The tangent and cotangent are derived by applying the sine and cosine to correct related ones of the signal and reference inputs of an analog to digital converter, to take ratios thereof.

8 Claims, 3 Drawing Figures

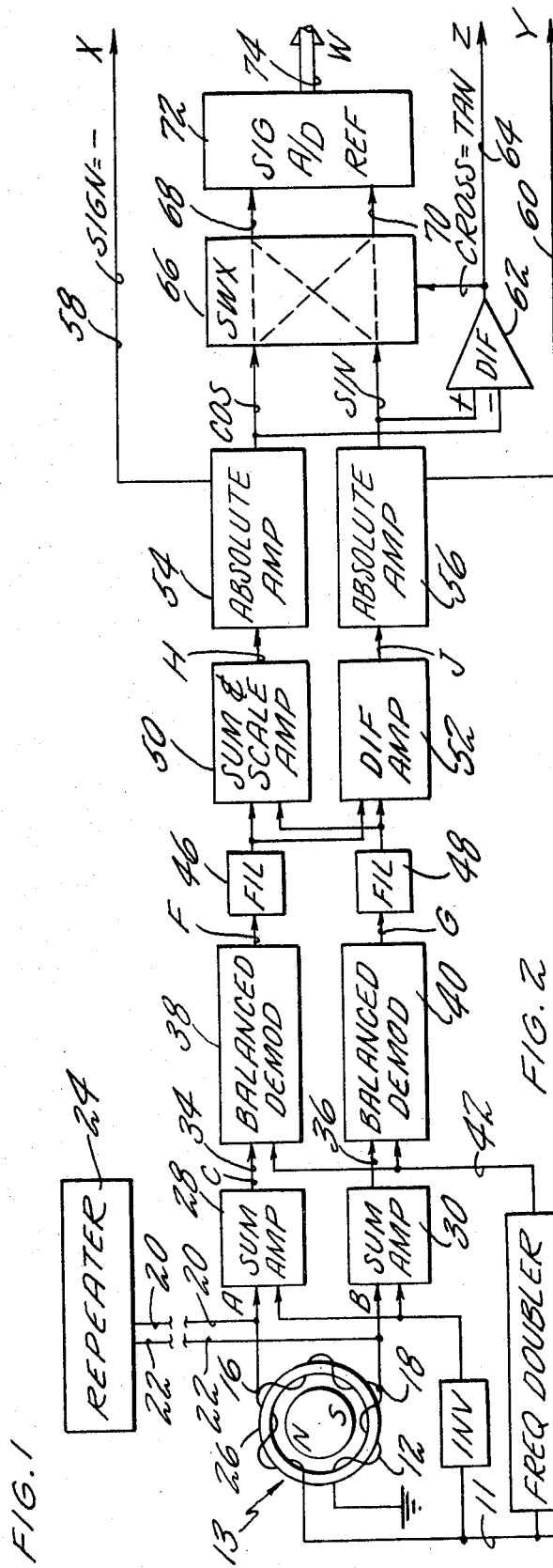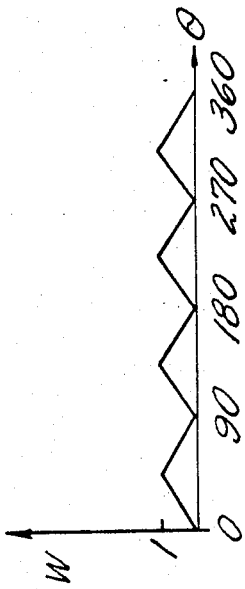

MAGNETIC SYNCHRO ANGLE RESOLVER

BACKGROUND OF THE INVENTION

1. Field of Invention

This invention relates to resolution of a complex wave, and more particularly to a magnetic synchro angle resolver.

2. Description of the Prior Art

Many aircraft, both commercial and military, include airborne integrated data systems which record numerous discrete, digital and analog parameters relating to the flight conditions of the aircraft while in flight so as to provide an indication of the behavior and response of the aircraft, the condition of its various subsystems, and a pattern for analysis of flight crew performance. To acquire data to be recorded in such systems, it is necessary to derive signals indicative of the various parameters without interfering with the operation of the component upon which the parameter is sensed, and without interfering with other display apparatus which may be utilized to provide cockpit display of the parameter. In many airborne applications, it is known to utilize electrically coupled transmitters and receivers for remotely indicating a position or a motion of one device. Some devices of this type known to the art have been referred to as synchros, one form of which simply comprises a three phase generator remotely driving a three phase motor. Another type is a device in which the second harmonic of the line voltage is generated in the transmitting portion and utilized to drive the receiving portion. Such devices employ a saturable toroidal stator and a permanent magnet rotor with taps on the stator to pick off the second harmonic driving voltage, or to insert it, at 120° intervals about the stator. Such devices are described in an article entitled "Magnesyn Remote Indication," by Robert S. Childs in the September, 1944 issue of AIEE Transactions, pp. 679–682. This type of device is referred to hereinafter as a magnetic synchro.

The second harmonic voltage, which is the generated signal utilized to control the receiver or repeater portion of the magnetic synchro system, is superimposed on the generated driving voltage which is typically 400 Hz, 115 volts AC. The second harmonic voltage may range, as a function of angle and loading conditions, from a fraction of a volt to several volts. THe detection of this small voltage on a carrier voltage at least an order of magnitude higher has heretofore been achieved by means of transformers arranged in a difference mode, so that line voltage is utilized directly to buck the line voltage out of the complex combined signal voltage which it is desired to detect. Another problem is that it has been found that there are harmonics with substantial amplitudes up to the 6th or 7th harmonic, giving a very complex wave output, which can introduce errors in determining the amplitude of the second harmonic; which necessarily results in errors in the recorded value of the angle measured.

Because the driving signals are tapped at 120° and 240° from the feedpoint on the stator, the proportion of main line voltage in each of the driving signals is a function of the precise point at which the tap is made. Due to tolerances in manufacturing, these points are not necessarily that precisely located and therefore the fraction of line voltage which appears at the tapping point can vary from case to case. This renders it difficult to determine exactly what proportion of line voltage is to be bucked out of the signals to eliminate the line voltage from the complex waveform including the desired second harmonic voltage. The net result in systems of this type in the prior art, is that there has always been some residual amount of the basic 400 Hz line voltage in the complex waveform, which is nearly impossible to remove by simple filtering, due to the closeness of the center frequencies, and which therefore also introduces amplitude errors which result in errors in angle being recorded.

A method which may be used to determine the angle of a magnetic synchro is to apply the voltages, with the line voltage bucked out, to a Scott tee type of transformer, which will provide signals indicative of the sine and the cosine of the angle. However, this then requires further angle resolution equipment or results in the recording of both the sine and cosine, relying upon digital processing equipment to resolve the angle in the analysis of the tape after it is made. Also, in order to get reasonable accuracy with the Scott tee, a large amount of apparatus is required in order to remove residual 400 Hz and all harmonics higher than the second, before application of the signals to the Scott tee.

As is known, it can be estimated that for each pound of hardware added to an airplane, the total weight increases more in the neighborhood of 5 or 6 pounds due to the need for increased thrust, increased fuel etc. Therefore, it is significant to maintain the size and weight of airborne equip-ment at an absolute minimum.

SUMMARY OF INVENTION

The object of the invention is to provide improved means for generating a signal indicative of the angle of the rotor in a magnetic synchro.

According to one aspect of the present invention, a pair of signals generated in a magnetic synchro, which signals are utilized to drive a repeater magnetic synchro, are filtered by using frequency-doubled line voltage in a pair of balanced demodulators. In accordance with another aspect of the present invention, a pair of signals relating to the angle of the rotor of a magnetic synchro are converted to a function of the sine and cosine of that angle by taking the difference and the scaled sum, respectively, of the signals; by recognizing the sign of both the sine and cosine function, the quadrant of the angle is determined; by sensing whether the sine is greater than the cosine, or vice versa, the half of the quadrant (octant) within which the angle is located is determined; the precise angle within the octant is determined by the tangent function for angles from 0° to 45° for angles in the odd octants, and is determined by the cotangent function for angles from 45° to 90° in the even octants. In accordance with another aspect of the invention, the angle of a magnetic synchro is completely and accurately resolved utilizing transistor logic circuitry.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a schematic block diagram of one embodiment of the present invention;

FIG. 2 is a chart illustrating signals in the embodiment of FIG. 1; and

FIG. 3 is a waveform of the output of said embodiment.

DESCRIPTION OF THE PREFERRED EMBODIMENT

Referring to FIG. 1, suitable power, which may comprise 400 Hz, 115 volts, is applied from a source 10 over a line 11 to a stator 12 of a harmonic transmitter such as magnetic synchro 13 having a permanent magnet rotor 14. The stator 12 has two taps 16, 18, which are connected by respective lines 20, 22 to a remotely located harmonic receiver such as a repeater 24 which has a like rotor and stator, and the rotor of which will assume the same orientation with respect to its stator as does the rotor 14 with respect to the stator 12. As is known, the rotor 14 may be connected to any device, the position of which is desired to be remotely displayed. As described in detail in the aforementioned Childs article, operation of the magnetic synchro 13 depends on the flux induced in the toroidal core 26 by the rotor 15 to aid or oppose the flux induced in the core 26 by the coil 12. The flux induced by the coil 12 alternates in dependence upon the line voltage of the source 10 (which is assumed to be 400 Hz in this embodiment) and the flux induced by the permanent magnet rotor 14 travels, say, from the north pole in opposite directions about both sides of the core 26 to the south pole. At any point where the fluxes are aiding at a given moment, the core becomes saturated; since saturation is independent of the polarity of the applied voltage at any point, saturation occurs at twice the line frequency (assumed to be 800 Hz in this embodiment). The physical pattern of saturation about the toroidal core 26 is a function of the position of the rotor, and this shows up as a difference in voltage between the taps 16, 18. Thus, on the lines 20, 22 are a pair of signals, A, B, which include, in addition to noise and a number of higher order harmonics, some function of the 400 cycle line voltage and a function of 800 Hz saturation of the toroid as follows:

$$A = \tfrac{2}{3} V \sin wt + E \sin (\theta-120) \sin 2wt + \text{(higher harmonics)} \quad (1)$$

$$B = \tfrac{1}{3} V \sin wt + E \sin (\theta-60) \sin 2wt + \text{(higher harmonics)} \quad (2)$$

where $V =$ peak voltage of source 10;
$w =$ angular frequency of source 10;
$E =$ peak voltage of second harmonic; and
$\theta =$ angular position of rotor 14; $\theta =$ zero when $A$ and $B$ are equal in phase and magnitude, and tends negative when $V$ tends positive.

The angles $\theta-120$ and $\theta-60$ are determined by the sign convention as set forth in the aforementioned Childs article; in any event, these work out to be 120° out of phase with each other.

The voltages A and B (together with some possible noise and including a number of higher order harmonics of increasingly lower amplitude) are the voltages which the present invention seeks to digitize for recording or other purposes. These voltages contain in the first term a large proportion of line voltage $$\tfrac{2}{3} V \sin wt \quad (3)$$

$$\tfrac{1}{3} V \sin wt, \text{ respectively.} \quad (4)$$

If the line is 115 volts RMS, $V$ is about 170 volts so the terms of equations (3) and (4) may have maximums as high as 110 volts and 55 volts, respectively. On the other hand, it has been found that values of $E$, the peak voltage of the second harmonic which is to be detected, range from a fraction of a volt to 6 or 8 volts. Thus, the inclusion of the line voltage components [equations (3) and (4)] in these signals renders it difficult to pick off the desired second harmonic component since it is such a small fraction of the line voltage component and since the line voltage component necessarily tends to saturate solid state devices which are desired to be utilized. Therefore, a first step of processing the signals on the lines 20, 22 is to remove the line voltage components in a pair of related summing amplifiers 28, 30. Each summing amplifier receives the inverse of line voltage from an inverting amplifier 32 which preferably has a gain of unity, although it could have a gain of less than unity, in dependence upon the summing ratios utilized in the amplifiers 28, 30. The resistors in the summing networks within the summing amplifiers 28, 30 are adjusted so that the A and B signals have respectively added thereto the opposite of the line voltage components as follows:

$$-\tfrac{2}{3} V \sin wt \quad (5)$$

$$-\tfrac{1}{3} V \sin wt, \text{ respectively.} \quad (6)$$

The output of the summing amplifiers 28, 30 on lines 34, 36 have signals C, D thereon as follows:

$$C = E \sin (\theta-120) \sin 2wt + \text{(residual } wt \text{ and harmonics)} \quad (7)$$

$$D = E \sin (\theta-60) \sin 2wt + \text{(residual } wt \text{ and harmonics)} \quad (8)$$

Thus $C$ and $D$ represent primarily an 800 Hz carrier $(2wt)$ modulated by two different phases of a function of the angle $\theta$ of the rotor 14.

The next step in processing is the removal of the 800 Hz carrier (and other components) in a pair of respective balanced demodulators 38, 40. The balanced demodulators 38, 40 may otherwise be called synchronous detectors, since these devices will provide full wave or parametric rectification of signal components at precisely the frequency of reference signal applied thereto on a line 42, in such a fashion that the output wave follows the input wave when the reference is positive, and the output wave is inverted from the input wave when the reference is negative (or vice versa). The reference in this case is provided to the balanced demodulators 38, 40 by a frequency doubler 44 which may conveniently take the form of a full wave rectifier followed by a high pass filter to remove the DC, and then followed by a low pass filter to reshape the 800 Hz ripple into something more like a sinusoidal wave. Other forms of frequency doublers, of which a number are known in the art, may be utilized if desired. The balanced demodulators 38, 40 provide signals F, G as follows:

$$F = E \sin(\theta - 120) + \text{(odd harmonics)} \quad (9)$$

$$G = E \sin(\theta - 60) + \text{(odd harmonics)} \quad (10)$$

A characteristic of the balanced demodulator, which is one of the important aspects of the present invention, is that the balanced demodulator will provide only the primary frequency and odd order multiples thereof; no even harmonics nor subharmonics will pass through the balanced demodulator. Thus the balanced demodulator gets rid of all residual line frequency which may result from the fact that the taps 16, 18 are not accurately positioned, or due to minor variations in the circuit parameters in any given implementation of the present invention. In addition, any signal at the input to a balanced demodulator which is an odd harmonic of the reference signal will be passed through the balanced demodulator, but reduced to the reciprocal of its order: for instance, the third harmonic is reduced by two-thirds, the fifth harmonic is reduced by four-fifths, and so forth. Thus, the signals F and G are relatively pure but may still have small odd harmonics therein. In order to remove these, bandpass or low pass filters are inserted between the demodulators 38, 40 and a pair of respective summation and scaling amplifiers 50, 52.

From the trigonometric identity $$\sin(X \pm Y) = \sin X \cos Y \pm \cos X \sin Y \quad (11)$$

equations (9) and (10) can be rewritten as $$F = E \sin \theta \cos 120 - E \cos \theta \sin 120 \quad (12)$$

$$F = E \sin \theta (-\tfrac{1}{2}) - E \cos \theta (\sqrt{3}/2) \quad (13)$$

$$G = E \sin \theta \cos 60 - E \cos \theta \sin 120 \quad (14)$$

$$G = E \sin \theta (\tfrac{1}{2}) - E \cos \theta (\sqrt{3}/2) \quad (15)$$

adding F and G yields $$F + G = -\sqrt{3} E \cos \theta \quad (16)$$

subtracting G from F yields $$F - G = - E \sin \theta \quad (17)$$

Thus the signals H and J would be simple functions of the desired angle. Operations (17) and (18) are performed in the amplifiers 50, 52 driving H and J at the output therefrom. It should be noted that amplifier 50 provides the addition of the two inputs divided by the square root of three and the block 52 provides just the difference between the two so as to provide a pair of signals H, J as follows:

$$H = - E \cos \theta \quad (18)$$

$$J = - E \sin \theta \quad (19)$$

It is desired to produce a single output signal or digital word which is proportional to the rotor angle $\theta$, from zero through 360°. Therefore, the signals H, J are combined and resolved as to the portion of the circular spectrum within which $\theta$ is located. Because the tangent is simply the ratio of the sine to the cosine, and it is a nearly linear function with a finite slope from 0° through 45°, and the cotangent is simply the ratio of the cosine to the sine and is a nearly linear function with a finite slope from 45° through 90°, the tangent and cotangent are utilized, in accordance with another aspect of the present invention, to provide a single output proportional to $\theta$ throughout the 360° spectrum. The signals H, J are each applied to an absolute amplifier 54, 56 each of which may take the form of an inverting amplifier connected in parallel with a non inverting amplifier, each amplifier being strapped with a diode in the same polarity so as to permit outputs of but a single polarity from either of them, or such other suitable rectification as may be desired. The output of each absolute amplifier 54, 56 has a unilateral pickoff to determine if the output is tending to be positive or negative, which provides a signal on a related line 58, 60 which is a digital ONE if the related function is negative, and comparison of the signals on the lines 58, 60 will determine the quadrant in which the angle is located (bearing in mind that X is the sign of the cosine function while Y is the sign of the sine function) as follows:

| QUADRANT | X | Y |
|---|---|---|
| 1 | 0 | 0 |
| 2 | 1 | 0 |
| 3 | 1 | 1 |
| 4 | 0 | 1 |

Thus, the X and Y signals on lines 58, 60 provide a digital indication of the quadrant in which $\theta$ is located.

As is known, the values of the sine or the cosine taken independently have very poor sensitivity and therefore accuracy at zero and 180° for cosine and a 90° and 270° for the sine. Therefore, these functions could give rise to significant errors in a digital output if either of them were utilized independently as an indication of the angle $\theta$. On the other hand, their ratios (the tangent and cotangent) are substantially linear and with a sufficient slope so as to provide a good indication of the angle at all angles of the spectrum if used appropriately. Therefore either the tangent or cotangent is utilized as the function to determine the angle $\theta$, depending upon which half quadrant or octant the angle is located. A difference amplifier 62 is connected to the output of the absolute amplifiers 54, 56 and will have an output on a line 64, which output is called the Z bit herein, whenever the sine is greater than the cosine. The Z bit on the line 64 is applied to a straight/cross switch 66, the function of which is to pass the signals from the amplifiers 54, 56 straight through to related lines 68, 70 or crossing them so as to apply the output to the lines 70, 68 respectively. These lines are connected to a signal input and a reference input, respectively, of an analog to digital converter 72. As is known, substantially all A to D converters compare the signal which is desired to be digitized with an analog reference voltage, and the output of the A to D converter comprises the ratio of the signal to the reference. In this case obviously, if the switch 66 is in the straight mode then the cosine will be ratioed to the sine resulting in the cotangent at the output lines 74. On the other hand, if the switch 66 is in the cross mode, then the sine will be ratioed to the cosine to develop the tangent at the output lines 74. Thus a digital word, W, representing either the cotangent or the tangent of the angle $\theta$ is developed at the output of the A to D converter 72. The difference amplifier 62 is arranged to provide the output on the line 64 when the cosine is greater than the sine, and its output reverses the switch 66 so as to provide the cross mode, resulting in the tangent. This is all illustrated in FIG. 2. FIG. 3 illustrates the manner in which the digital word W will vary from 0° to 360°. Basically the octant is defined by FIG. 2, and the relationship for the first half quadrant is a tangent of $\theta$ function for $\theta$ between zero and 45°, and for the second half quadrant is a cotangent of $\theta$ function for $\theta$ between 45° and 90°.

The straight cross switch may comprise nothing more than a diode switch, or may preferably take the form of a field effect transistor switch controlled by the signal on the line 64. The particular A to D converter utilized is not significant to the present invention; since there are a plethora of these known to the art, further reference thereto will not be made herein.

The embodiment described herein is seen to provide two major functions. The first is to provide signals without unwanted harmonics or line voltage in them, which are functions of the angle $\theta$. The second is resolving the two related functions of the angle $\theta$ to a single function indicative of the angle $\theta$, which maintains good sensitivity and is finite from 0° to 360°.

Although the invention has been shown and described with respect to preferred embodiments thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. Apparatus for extracting a sinusoidal component at a given frequency from a complex wave including a predominent submultiple component at one half said given frequency and components at harmonics of said given frequency, comprising:
   means presenting a signal equal to but out of phase with the submultiple component of said complex signal;
   a summing amplifier responsive to said complex signal and to said out of phase signal, for presenting a refined signal equivalent to said complex signal with substantially all of said submultiple component removed;
   means presenting a reference signal at said given frequency; and
   balanced demodulator means responsive to said refined signal and said double frequency signal for presenting a third signal equivalent of said complex signal with all of said submultiple component removed, with all even harmonics removed, and with all odd harmonics diminished by amounts related to the harmonic order.

2. Apparatus for processing a pair of signals derived in a harmonic generating type of magnetic synchro generator and including components related to the position of the rotor thereof, comprising:
   means including a pair of respective balanced demodulators for extracting from said complex signal waveform signals comprising substantially only the second harmonic component thereof;
   and means for resolving said pair of signals to provide a signal manifestation indication of the rotary position of said rotor.

3. Apparatus for providing a signal manifestation of the angular position of a rotor of a second harmonic generating type of magnetic synchro which is driven by a source of alternating current line voltage, said synchro providing a pair of complex signal waveforms including components of line voltage, components at the second harmonic of line voltage, the phase relationship of which is a function of the rotary position of the rotor in said synchro, and components of higher ordered harmonics of said line voltage, comprising:
   inverter means responsive to the source of line voltage for developing a signal out of phase therewith;
   a pair of summing amplifiers connected to said inverter means and responsive to said pair of complex signals for subtracting substantially all of the line voltage components from said pair of complex signals;
   balanced demodulator means connected and responsive to said summing amplifiers for developing a pair of signals comprising essentially only the second harmonic and diminished amounts of odd higher ordered harmonics of said complex signals;
   filter means responsive to each of said balanced demodulator means for filtering the odd harmonic components from said complex wave.

4. Apparatus according to claim 3 further comprising:
   means responsive to said filter means for developing signals which are the function of the sum and the difference of said filtered complex waveforms;
   means developing a signal indicative of the magnitude of said sum signal exceeding the magnitude of said difference signal;
   an A to D converter having a signal input and a reference input for providing a digital manifestation of the ratio of the magnitude of a signal at said signal input to the magnitude of a signal at said reference input; and
   means responsive to said relative magnitude signal for passing said sum and difference signals to the reference and signal inputs of said A to D converter, respectively, and for passing said sum and difference signals to said signal and reference inputs of said A to D converter, respectively in response to the absence of said relative magnitude signal.

5. Apparatus according to claim 4 further comprising:
   means developing a signal indicative of the sign of said sum signal and a signal indicative of the sign of the difference signal, said sign signal, said magnitude signal and the output of said A to D converter comprising a signal manifestation of the angular position of said rotor.

6. Apparatus for determining a phase angle from a pair of signals which comprise bipolar quadrature related functions of said angle, comprising:

means responsive to the absolute value of the magnitude of said two signals for developing a cross signal in response to a first one of said function signals having an absolute magnitude greater than the second one of said function signals;

an analog to digital converter having a signal input and a reference input, said analog to digital converter providing a digital manifestation of the ratio of the magnitude of a signal applied to said signal input to the magnitude of a signal applied to said reference input; nd means responsive to said first signal to connect said first signal to said signal input of said A to D converter and said second signal to said reference input of said A to D converter, and responsive in the absence of said one signal for connecting said first signal to the reference input of said A to D converter and said second signal to the signal input to said A to D converter.

7. Apparatus in accordance with claim 5 additionally comprising:

means responsive to each of said first and second signals for generating a related sign signal dependent on the instantaneous sign thereof, said cross signal, said sign signals and the output of said A to D converter comprising a signal manifestation of said phase angle.

8. Apparatus for developing a signal manifestation of an angle, $\theta$, from a pair of signals A, B developed from a magnetic synchro driven by a source of line voltage of amplitude V sinusoidally varying at a rate w said signals A, B being represented as $A = \frac{2}{3} V \sin wt + E \sin (\theta - 120) \sin 2 wt +$ (higher harmonics)

$B = \frac{1}{3} V \sin wt + E \sin (\theta - 60) \sin 2 wt +$ (higher harmonics)

where $E$ equals the peak voltage of the second harmonic of the line voltage, said apparatus comprising:

first means responsive to said signals $A, B$ and to the source of line voltage to remove substantially all of the line voltage component from said signals $A, B$ to develop a pair of respectively relating signals $C$ and $D$ as $C = E \sin (\theta - 120) \sin 2 wt +$ (residual wt and harmonics)

$D = E \sin (\theta - 60) \sin 2 wt +$ (residual wt and harmonics);

second means responsive to the line voltage source and to said first means for synchronously rectifying said signals $C$ and $D$ at twice the line frequency so as to develop a pair of related signals $F, G$ as follows $F = E \sin (\theta - 120) +$ (odd harmonics)

$G = E \sin (\theta - 60) +$ (odd harmonics);

third means responsive to said second means for taking the weighted sum and the difference of said signals $F$ and $G$ so as to develop a pair of respective signals $H$ and $J$ as $H = F + G / \sqrt{3} = - E \cos \theta$ $J = F - G = - E \sin \theta$;

fourth means responsive to said third means for developing a signal $X$ when in response to $H$ being negative, a signal $Y$ in response to $J$ being negative, and a signal $Z$ in response to $J$ being greater in absolute magnitude than $H$; and fifth means including an analog to digital converter having a signal input and a reference input for developing a digital word manifestation of the ratio of the magnitude of a signal on the signal input to the magnitude of the signal on the reference input, said means including means for applying the absolute value of said signal H to said reference input and the absolute magnitude of said signal J to said signal input in response to the presence of said signal Z, and applying said signals H and J conversely to said signal and reference inputs, respectively, in response to the absence of said signal Z, the output manifestation of said analog to digital converter comprising the low order portion and said signals X, Y and Z comprising the respectively highest ordered portions of a digital output word signal manifestation of said angle $\theta$.

* * * * *